United States Patent [19]

Miura

[11] E Patent Number: Re. 33,715

[45] Reissued Date of Patent: Oct. 15, 1991

[54] SHOCK ABSORBER

[75] Inventor: Takeshi Miura, Fukushima, Japan

[73] Assignee: NOK Corporation, Japan

[21] Appl. No.: 98,041

[22] Filed: Sep. 17, 1987

Related U.S. Patent Documents

Reissue of:

[64] Patent No.: 4,542,811
Issued: Sep. 24, 1985
Appl. No.: 436,711
Filed: Oct. 26, 1982

[30] Foreign Application Priority Data

Sep. 21, 1982 [JP] Japan ..... 57-142915

[51] Int. Cl.[5] ..... F16F 9/36

[52] U.S. Cl. ..... 188/322.17; 188/315; 277/152

[58] Field of Search ..... 188/322.17, 322.21, 188/315; 267/64.28; 277/27, 152, 153, 181, 182, 183; 92/168 R

[56] References Cited

U.S. PATENT DOCUMENTS

| | | | |
|---|---|---|---|
| 3,520,384 | 7/1970 | Nicholls . | |
| 3,612,547 | 10/1971 | Kan . | |
| 3,804,217 | 4/1974 | Keijzer et al. . | |
| 4,005,769 | 2/1977 | Itoh . | |
| 4,015,883 | 4/1977 | Taylor | 277/153 |
| 4,055,352 | 10/1977 | Allinquant et al. . | |
| 4,106,781 | 8/1978 | Benjamin et al. . | |
| 4,108,287 | 8/1978 | Kato . | |
| 4,134,596 | 1/1979 | Kawai et al. | 277/152 |
| 4,189,033 | 2/1980 | Katsumori | 188/322.17 X |
| 4,278,261 | 7/1981 | Miura . | |
| 4,304,414 | 12/1981 | Forch | 277/153 |
| 4,342,447 | 8/1982 | Marx . | |
| 4,508,020 | 4/1985 | Szcupak . | |
| 4,527,673 | 7/1985 | Szcupak | 277/153 X |

FOREIGN PATENT DOCUMENTS

| | | | |
|---|---|---|---|
| 32988 | 8/1981 | European Pat. Off. | 188/322.17 |
| 78834 | 6/1980 | Japan | 188/322.17 |
| 103130 | 8/1980 | Japan | 188/322.17 |
| 2045892 | 11/1980 | United Kingdom . | |

*Primary Examiner*—George E. A. Halvosa
*Attorney, Agent, or Firm*—Owen E. Perry; Charles R. White

[57] ABSTRACT

A shock absorber capable of effectively preventing a gas from leaking from a gas chamber, maintaining an oil seal in a firmly-held state, and preventing the reciprocating movements of a rod from adversely affecting the function of the oil seal, comprising an oil cylinder and a gas tube, which are joined together in a concentrically-arranged state to form a gas chamber therebetween; a rod, which is moved reciprocatingly in the oil cylinder; a bearing having an axially extending cylindrical support portion and fixed to an end portion of the oil cylinder to form an oil chamber in cooperation with the oil cylinder and rod support in such a manner that the rod can be slidingly moved; and an oil seal, which has a main lip sealingly slidable with respect to a circumferential surface of the rod, and a frustoconical check valve lip resiliently contacting an outer surface of the cylindrical support portion and adapted to allow an oil to flow from the oil chamber to the gas chamber and prevent the oil from flowing in the opposite direction, and the seal is held on the cylindrical support portion as a radially-extending portion, with which the main lip and check valve lip are connected integrally with each other.

13 Claims, 3 Drawing Sheets

SHOCK ABSORBER

Matter enclosed in heavy brackets [ ] appears in the original patent but forms no part of this reissue specification; matter printed in italics indicates the additions made by reissue.

BACKGROUND OF THE INVENTION

This invention relates to a double cylinder type shock absorber having an oil chamber and a gas chamber, and more particularly to a shock absorber capable of effectively preventing a gas in a gas chamber from leaking therefrom.

In a double cylinder type shock absorber using an oil and a gas and consisting of a combination of a hydraulic means composed of a piston and an oil cylinder and a gas tube provided concentrically on the outer side of the hydraulic means to form a gas chamber therebetween, it is necessary that a means for preventing the leakage of a pressure gas in addition to a seal means for preventing the leakage of a pressure oil be devised. FIG. 1 shows an example of a double cylinder type shock absorber, which is disclosed in Japanese Published Unexamined Utility Model Application No. 1979-53193, and which is provided with seal means of the above-mentioned kind for preventing the leakage of a pressure oil and a pressure gas. This shock absorber has the following constructional elements. Namely, it is provided with a smaller-diameter oil cylinder 1 and a larger-diameter gas tube 2, which are joined together in a concentrically arranged state to form a gas chamber 3 therebetween; a piston (not shown) mounted fixedly on an end portion of a rod 4 and disposed in the oil cylinder 1 in such a manner that the piston can be moved in the axial direction thereof; a bearing 5 adapted to guide the reciprocating movements of the rod 4, fixed to an end portion of the oil cylinder 1, and forming an oil chamber 6 in cooperation with the oil cylinder 1 and rod 4; an oil seal cover 9 supported on an end portion of the gas tube 2; an oil seal 10 consisting of a rubber-like elastic material, disposed on the inner side of the oil seal cover 9, and adapted to preventing an oil from leaking outside and the external dust from entering an inner space on the side of the bearing 5; a check valve 11 consisting of a rubber-like elastic material, having a check valve lip 12 fixed to a washer 13, having a substantially L-shaped cross-section, and disposed in a position adjacent to the oil seal 10; a conical circumferential surface 15 formed on the portion of the bearing 5 which is on the side of the oil seal with the check valve lip 12 resiliently contacting the conical circumferential surface 15 to form an inner hollow chamber 16 on the side of the rod 4 and an outer hollow chamber 17 on the side of the oil seal cover 9; a coiled spring 18 disposed in the outer hollow chamber 17 and adapted to urge the check valve 11 toward the oil seal 10; and a communication bore 19 formed suitably in the vicinity of the outer circumferential surface of the bearing 5 so as to communicate the outer hollow chamber 17 with the gas chamber 3.

When the piston and rod 4 in the above shock absorber are moved upward, the pressure in the oil chamber 6 increases, so that a part of the oil flows into the inner hollow chamber 16 through a clearance between the bearing 5 and rod 4. At this time, the oil seal 10 prevents the oil from leaking outside. Consequently, the check valve lip 12 is expanded, so that the oil flows into the outer hollow chamber 17. The oil then flows through the communication bore 19 into the gas chamber 3 to be mixed with the oil existing in a lower portion thereof. When the piston and rod 4 are moved downward, the pressure in the oil chamber 6 decreases, and the lip 12 of the check valve 11 is brought into press contact with the conical circumferential surface of the bearing 5. Accordingly, the pressure gas in the gas chamber 3 and outer hollow chamber 17 is prevented from flowing into the inner hollow chamber 16.

In the above shock absorber, the oil seal 10 and check valve 11 are supported on the coiled spring 18. Therefore, the actions of the oil seal 10, which is drawn downward due to the friction between the rod 4 and oil seal 10, especially, during a downward stroke of the rod 4, having influence on the contacting condition of the check valve lip 12 and the conical circumferential surface 15 of the bearing 5. There is the possibility in such a shock absorber that the pressure gas in the gas chamber 3 leaks into the inner hollow chamber 16 and flows into the oil chamber 6 to be mixed with the oil, or to leak outside through the sliding portions of the oil seal 10 and rod 4.

SUMMARY OF THE INVENTION

An object of the present invention is to provide a shock absorber, which is free from the drawbacks encountered in the above-described prior art shock absorber, and which is provided with stably-supported oil seal and check valve lip.

In order to achieve the above object, a shock absorber according to the present invention is constructed as follows. A bearing, which supports a reciprocatingly-movable rod, is provided at a radially intermediate portion thereof with a cylindrical support portion extending in the axial direction thereof, and a main lip, which is adapted to sealingly slide on a circumferential surface of the rod and prevent an oil from leaking outside and the external dust from entering the interior of the shock absorber, and a check valve lip resiliently contacting an outer circumferential surface of the cylindrical support portion are fixed unitarily to a reinforcing member of a metal sheet to form an oil seal, which is joined to a gas tube as a radially extending portion thereof, which is formed between the main lip and check valve lip, is supported at an inner surface thereof on an end surface of the cylindrical support portion. The oil seal and gas tube are joined together by fitting the oil seal in an oil seal cover, which is formed independently thereof so as to have a cylindrical portion and an inwardly-extending flange portion, and which has a substantially L-shaped longitudinal section, to support the radially-extending portion of the oil seal, which is formed between the main lip and check valve lip thereof, on the end surface of the cylindrical support portion of the bearing, and join the cylindrical portion of the oil seal cover to an end portion of the gas tube, or sandwiching an outer circumferential end portion of the oil seal between an outer end portion of the bearing and a bent end portion of the gas tube. The cylindrical support portion extending from bearing is provided in the end surface thereof with grooves for communicating the inside and outside thereof with each other. *Another object of the present invention is to provide a new and improved unitized seal for an oil and a gas charged shock absorber having an annular lip deflectable outward from a central axis to define a check valve seal.*

The above and other objects as well as advantageous features of the invention will become apparent from the following description of the preferred embodiments taken in conjunction with the accompanying drawings.

DESCRIPTION OF THE PREFERRED EMBODIMENTS

Figure 1:
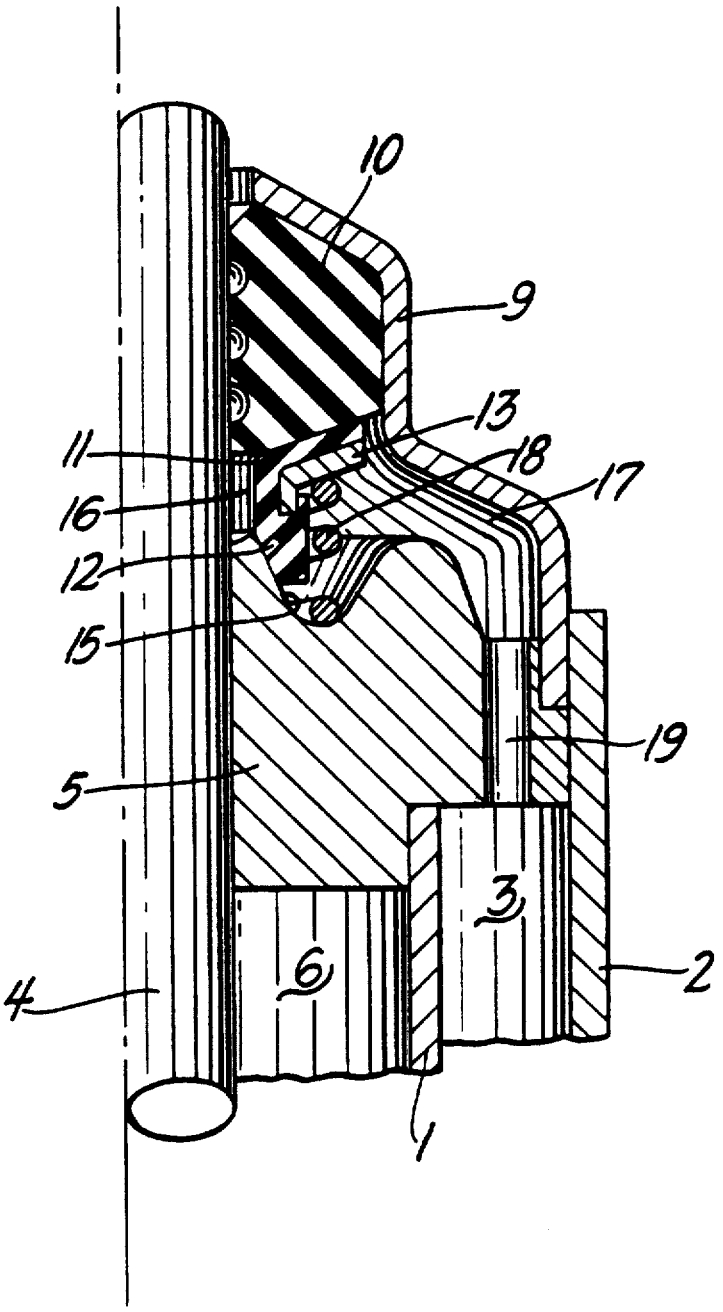
FIG. 1. PRIOR ART
FIG. 1 is a sectional view of an example of a prior art shock absorber.
Figure 2:
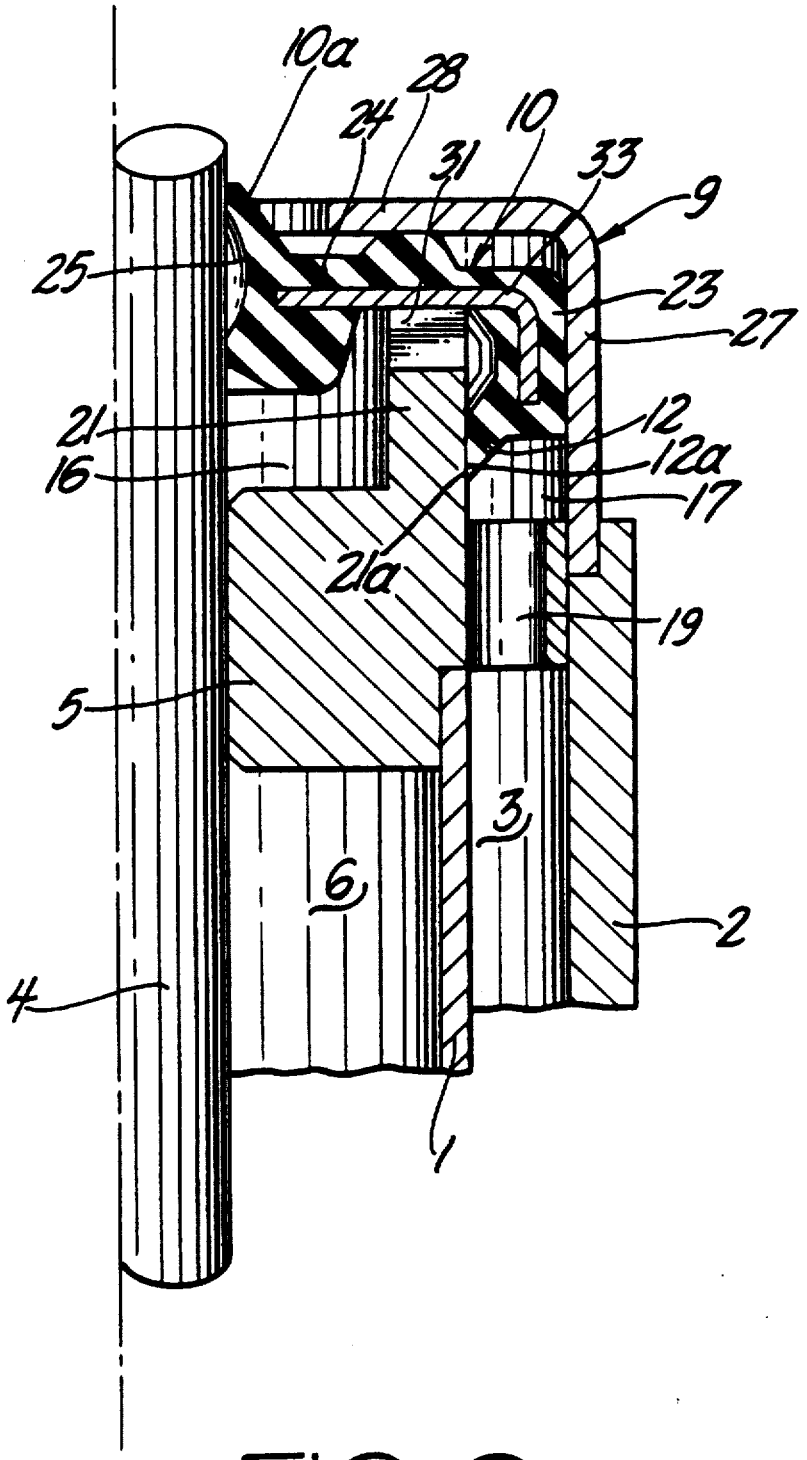
FIG. 2 is a sectional view of an embodiment of the present invention.

The embodiments of the shock absorber according to the present invention will now be described with reference to the drawings. In the embodiment shown in FIG. 2, a bearing 5, which is fitted to end portions of an oil cylinder 1 and a gas tube 2 to form a gas chamber 3 between the oil cylinder 1 and gas tube 2, and an oil chamber 6 between the oil cylinder 1 and a rod 4, and which supports the rod 4, is provided with a cylindrical support portion 21 on the opposite side of the oil chamber 6, which support portion 21 extends in the axial direction of the bearing 5. The oil seal 10[,] *is a unitized or singular seal unit with a generally cylindrical main body means 10a having a centralized opening with a longitudinal axis through which rod 4 extends. As shown, the oil seal is* reinforced by an annular reinforcing member 33 of a substantially L-shaped longitudinally section, has a substantially cylindrical *seal and* fixing portion 23 formed at a radially outer section thereof[,] *which extends along a line of revolution substantially parallel to the axis of the axis of the rod opening of the seal. The cylindrical portion 23 is integrally connected to the main body 10a by* a bull's eye type radially-extending *flange* portion 24[,]. *The main body has inwardly extending* a main [lip] *oil and dust seal lip means generally indicated at* 25 sealing sliding on a circumferential surface of the rod 4, and check valve lip 12 extending inward in the diagonal direction from a lower end of the cylindrical *seal and* fixing portion 23 and having a substantially frusto-conical shape. The oil seal 10 is fitted in a cylindrical portion 27 of an oil seal cover 9, which has the cylindrical portion 27 and an inwardly extending flange portion 28, and which is formed to have a substantially L-shaped longitudinal section and joined to the end portion of the gas tube 2. The radially-extending portion 24 reinforced by the annular reinforcing member 33 is held between the cylindrical support portion 21 of the bearing 5 and the inwardly-extending flange portion 28 of the oil seal cover 9 with the check valve lip 12 resiliently contacting the outer circumferential surface *21a* of the cylindrical support portion 21[.] *which serves as seating means for the annular surface 12a of the check valve lip 12.* The cylindrical support portion 21 of the bearing 5 is provided in the end section thereof with communication grooves 31 for communicating the inside and outside of the bearing 5 with each other. A communication bore 19 is provided in the vicinity of the outer circumferential surface of the bearing 5 so as to communicate an outer hollow chamber 17, which is formed on the outer side of the check valve lip 12, and the gas chamber 3 with each other.

Figure 3:
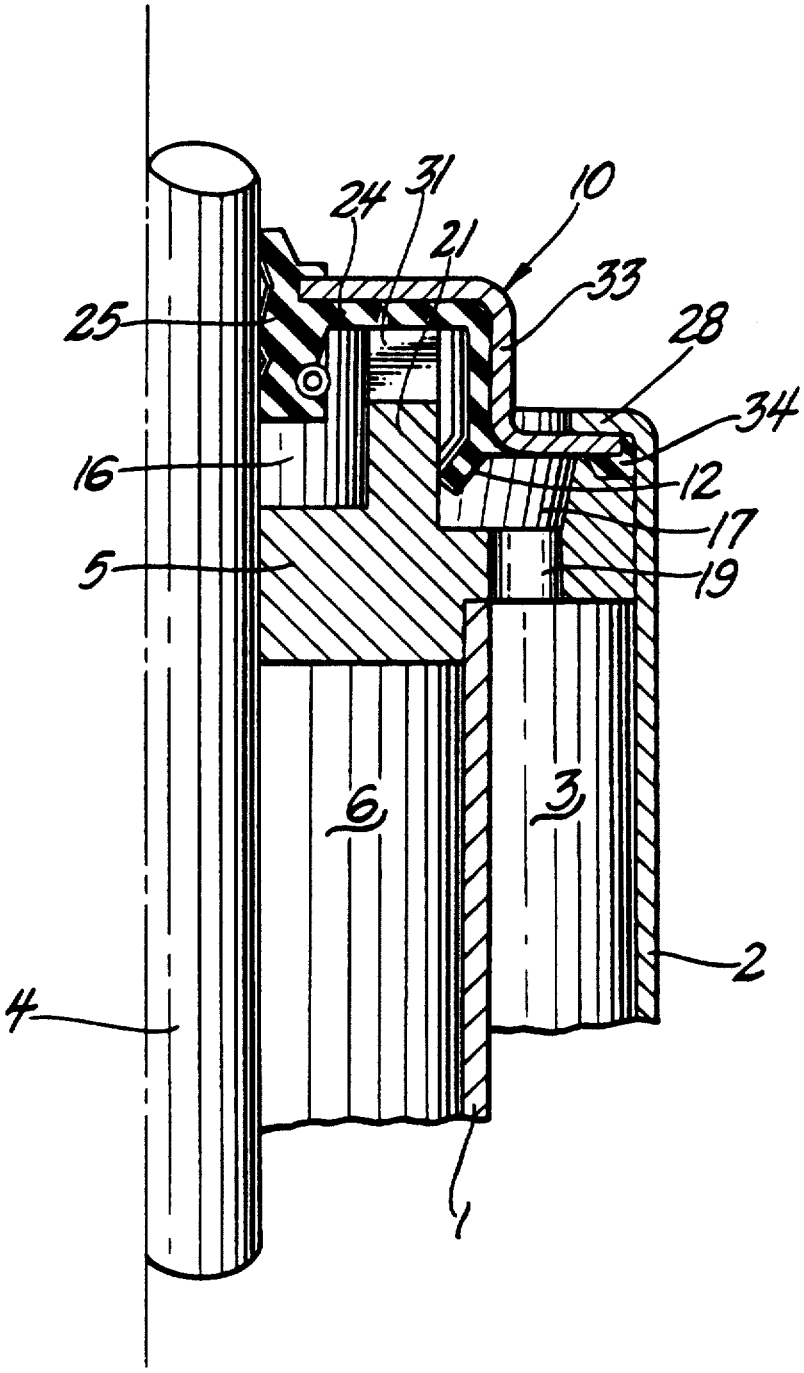
FIG. 3 is a sectional view of another embodiment of the present invention.

In another embodiment of the present invention shown in FIG. 3, a bearing 5, which is fitted to end portion of an oil cylinder 1 and a gas tube 2 to form a gas chamber 3 between the oil-cylinder 1 and gas tube 2, and an oil chamber 6 between the oil cylinder 1 and a rod 4, and which supports the rod 4, is provided with a cylindrical support portion 21 on the opposite side of the oil chamber 6, which support portion 21 extends in the axial direction of the bearing 5. An oil seal 10 *has integral body means which is 10a* is reinforced by an annular reinforcing member 33 consisting of a metal sheet and having a substantially Z-shaped longitudinal section. The oil seal 10 is made of a rubberlike elastic material, and consists of a main lip 25, a substantially frusto-conical check valve lip 12, and a sealing and fixing portion 34, which is provided at an outer circumferential end of the oil seal 10. The sealing and fixing portion 34 is inserted into an annular groove provided in an outer circumferential end portion of the bearing 5, and an end portion of the gas tube 2 is bent to form an inwardly-extending flange portion 28 in order to fix the sealing and fixing portion 34, reinforced by the annular reinforcing member 33 thereto. Thus, the main lip 25 is brought into resilient contact with a circumferential surface of the rod 4, and the check valve lip 12 with the circumferential surface *21a* of the cylindrical support portion 21, respectively, to form inner and outer hollow chambers 16, 17 between the oil seal 10 and bearing 5. The hollow chamber 16 communicates with the oil chamber 6. A radially-extending portion 24, which is formed between the main lip 25 and check valve lip 12, contacts at its inner surface the end surface of the cylindrical support portion 21. The cylindrical support portion 21 is provided in its end portion with communication grooves 31, and communication bores 19 opened into the gas chamber 3 are provided in the vicinity of an outer end portion of the bearing 5.

During an upward stroke of the rod 4 in the shock absorber according to the present invention constructed as described above, the oil flowing out to the side of the oil seal 10 through a clearance between the bearing 5 and rod 4 is prevented from leaking outside by the main lip 25. The oil thereby flows through the communication grooves 31 to reach the check valve lip 12 and expand the same. Consequently, the oil flows into the gas chamber 3 through the outer hollow chamber 17 and communication bores 19. During a downward stroke of the rod 4, the pressures in the inner hollow chamber 16 and oil chamber 6 decrease, so that the check valve lip 12 is brought into press contact with the circumferential surface *21a* of the cylindrical support portion 21. Accordingly, the pressure gas can be prevented from flowing out [to the side of] *of chamber 3 into* the inner hollow chamber 16[.] *which communicates with the oil chamber 6 through the aforementioned rod clearances.*

The shock absorber according to the present invention having the above-mentioned construction permits obtaining the following effects. A bearing adapted to guide a reciprocatingly movable rod is provided with a cylindrical support portion, and an oil seal has a main lip, which is adapted to slide on a circumferential surface of the rod and prevent the leakage of an oil, and a check valve lip contacting a circumferential surface of the cylindrical support portion. The oil seal is held at its reinforced portion between the bearing and the inwardly-extending flange portion provided at the end portion of the gas tube with an intermediate portion between the main lip and check valve lip contacting he cylindrical support portion. Therefore, the oil seal can be maintained in a firmly-held state. There is no possibility at all that the reciprocating movements of the rod will adversely affect the sealing functions of the main lip or check valve lip. Since the bearing is provided with the cylindrical support portion, an oil reservoir is formed in an inner hollow chamber, so that the bearing and main lip can be kept in an excellently-lubricated state with respect to the reciprocating movements of the rod.

The present invention is not, of course, limited to the above embodiments; it may be modified in various ways within the scope of the appended claims.

What is claimed is:

1. A shock absorber comprising an oil cylinder 1 and a gas tube 2, which are jointed together in a concentrically-arranged state to form a gas chamber 3 therebetween; a rod 4 moved reciprocatingly in said oil cylinder 1; and a bearing 5 having an axially extending cylindrical support portion 21, fixed to an end portion of said oil cylinder 1, forming an oil chamber 6 in cooperation with said oil cylinder 2 and said rod 4, said axially extending cylindrical support portion 21 having a communication groove 31 and *having cylindrical surface means* supporting said rod 4 in such a manner that said rod 4 can be slidingly moved; and [an] *a unitized* oil seal 10 *having a portion* reinforced by an annular reinforcing member 33, which has a main lip 25 sealingly slidable with respect to a circumferential surface of said rod 4, and a check valve lip 12 *disposed radially outward of said main lip 25* having substantially frusto-concial shape, resiliently [contracting] contacting an outer circumferential surface of said cylindrical support portion 21, and adapted to allow an oil to flow from said oil chamber 6 to said gas chamber 3, and prevent a gas from flowing in the opposite direction, and whose reinforced portion is firmly held between said bearing 5 and inwardly-extending flange portion 28 provided at the end portion of said gas tube 2 as a radially-extending portion 24, with which said main lip 25 and said check valve lip 12 are connected integrally with each other [is] *and said reinforced portion being* supported on said cylindrical support portion 21.

2. A shock absorber according to claim 1, wherein said oil seal 10 is fitted in an oil seal cover 9 having a cylindrical portion 27 and said inwardly extending flange portion 28 and joined at said cylindrical portion 27 to said gas tube 2 so as to firmly hold said oil seal 10 between said inwardly-extending flange portion 28 and said cylindrical support portion 21.

3. A shock absorber according to claim 1, wherein said oil seal 10 has a [fixing] *sealing* portion 34 at an outer circumferential end thereof, which fixing portion 34 is firmly sandwiched between said inwardly-extending flange portion 28 of said gas tube 2 and said bearing 5.

*4. In a shock absorber of the type having an oil cylinder 1 and a gas tube 2 concentrically arranged to form a gas chamber 3 therebetween; a reciprocable rod 4 having a cylindrical circumferential surface disposed in said oil cylinder 1; a bearing 5 having seating means 21a thereon and being fixed to an end portion of said oil cylinder 1 and forming an oil chamber 6 in cooperation with said oil cylinder 1 and said rod 4, and slidingly supporting said rod 4, the improvement comprising a unitized seal assembly 10 for said shock absorber having body means 10a cooperating with the bearing 5 for forming an inner chamber 16 above and in communication with the oil chamber 6, said seal assembly 10 further including an annular reinforcing member 33 for reinforcing said body means 10a, an annular oil sealing lip 25 integral with said body means 10a sealingly and slidable with respect to a circumferential surface of said rod 4, an annular dust sealing lip axially spaced from said oil sealing lip integral with said body means sealingly and slidably contacting the circumferential surface of said rod, an annular check valve lip 12 integral with said body means and disposed radially outward of said oil sealing lip for sealingly contacting said seating means 21a on said bearing 5 to form a one-way valve to block the flow of gas from said gas chamber to said inner chamber 16 and deflectable from said seating means when said rod strokes outwardly with respect to said oil chamber 6 and to thereby allow oil to flow from said oil chamber 6 to said gas chamber 3, said reinforcing member 33 extending outwardly from said body means to an outer periphery to support said oil and dust sealing lips with respect to said check valve lip 12 for maintaining a preset dimensional relationship therebetween, and sealing means associated with the outer periphery of said reinforcing member and disposed radially outward of said annular check valve lip for sealing said gas chamber.*

*5. A shock absorber according to claim 4 wherein said bearing 5 has an axially extending cylindrical support portion 21, said check valve lip 12 is biased against said bearing 5 at said axially extending cylindrical support portion 21, and wherein said seating means 21a on said bearing 5 is an outer circumferential surface on said cylindrical support portion 21.*

*6. A shock absorber according to claim 5 wherein said cylindrical support portion 21 includes a communication groove 32 for providing fluid communication between said oil chamber 6 and said gas chamber 3.*

*7. A unitized seal for a shock absorber of the type having an oil cylinder 1 and a gas tube 2 concentrically arranged to form a gas chamber 3 therebetween; a cylindrical rod 4 disposed for linear reciprocating motion in said oil cylinder 1; a bearing 5 having seating means thereon and being fixed to an end portion of said oil cylinder 1 and forming an oil chamber 6 in cooperation with said oil cylinder 1 and slidingly supporting said rod 4, and a seal cover affixed to the gas tube and having a central opening through which said rod extends, said unitized seal comprising: generally cylindrical seal body means 10a and an annular sealing flange portion 24 extending from said body means and cooperating with the bearing 5 for forming an inner chamber 16 above and in hydraulic communication with the oil chamber 6, said flange portion of said unitized seal 10 being reinforced by an annular reinforcing member 33 extending from said seal body means, a radial inner oil seal lip 25 on said seal body means sealingly slidable with respect to a circumferential surface of the rod 4, a radial inner dust seal lip on said seal body means separate from said oil seal lip for sealing engagement with said rod, a check valve lip 12 integral with said sealing flange portion and disposed radially outward of said oil seal lip for resiliently contacting said seating means on the bearing 5 for deflection outwardly from said seating means to allow oil to flow from the oil chamber 6 to the gas chamber 3 when said rod moves in an outward direction with respect to said cylinder and to subsequently recover into sealing engagement with said seating means when said rod moves in an inward direction with respect to said cylinder to prevent gas from flowing in the opposite direction from said gas chamber to said inner chamber 16, said flange portion being firmly held between the bearing 5 and the seal cover and wherein said flange portion as reinforced by said reinforcing member integrally joins said seal body means 10a to said check valve lip 12.*

*8. The unitized seal according to claim 7 wherein said bearing 5 has an axially extending cylindrical support portion 21, said check valve lip 12 resiliently engages said bearing 5 at said axially extending cylindrical support portion 21, and wherein the seating means 21a on the bearing 5 is an outer circumferential surface on said cylindrical support portion 21.*

*9. A seal according to claim 7 wherein the cylindrical support portion 21 includes a communication groove 31 for providing fluid communication between the oil chamber 6 and the gas chamber 3.*

*10. A seal according to claim 7 wherein said check valve lip 12 has a substantially frusto-conical shape and includes at least one annular surface 12a adapted to define, in cooperation with said seating means 21a a generally circular, radially inward acting excluder seal band.*

*11. A unitized seal for a damper device having a first part and a second part concentrically arranged to form a gas chamber 3 therebetween; a cylindrical rod member mounted for reciprocating movement in said first part; a bearing 5 having seating means thereon and being fixed to an end portion of said first part and forming an oil chamber 6 in cooperation with said first part and said reciprocating rod member, said bearing having a control opening slidingly supporting said reciprocating member, said damper device further having a cap member, said seal comprising: body means 10a of a rubber like material cooperating with the bearing 5 for forming an inner hollow chamber 16 in hydraulic communication with the oil chamber 6, an annular main oil sealing lip 25 radially inward from said body means 10a sealingly slidable with respect to a circumferential surface of the reciprocating member, an annular resilient check valve lip 12 integral with said body means 10a and disposed radially outward of said oil sealing lip and sealingly contacting the seating means 21a on the bearing 5 and deflectable away from sealing contact with said seating means to provide an opening to allow oil to flow from the oil chamber 6 to the gas chamber 3 when said reciprocable member strokes out of said oil chamber 6, and recoverable into sealing contact with said seating means to prevent a gas from flowing in the opposite direction when said reciprocable member strokes in an inward direction with respect to said oil chamber 6, said body means 10a having a reinforced portion extending to a terminal edge to be firmly held between the bearing 5 and the cap member and wherein said reinforced portion integrally joins said main lip 25 to said check valve lip 12 for maintaining a preset dimensional relationship therebetween, and an outer annular seal means associated with said terminal edge for sealing said gas chamber.*

*12. A singular unitized fluid seal unit for installation in a piston-and-rod type hydraulic and gas-charged shock absorber comprising a discrete generally cylindrical and centralized body means of rubber-like material having a central piston rod opening therethrough about a longitudinal axis, said body means having first and second annular lip seal means integral with said body means and extending radially into said piston rod opening and defining an inner diameter of said unit, said body means having an annular thin wall flange extending radially outward from integral connection with said body means and a generally cylindrical seal portion depending along a line of revolution substantially parallel to said axis from integral connection with said thin wall flange, said depending cylindrical seal portion being radially spaced from and encompassing said cylindrical body means, third annular lip seal means on an end of said depending cylindrical seal portion, said third annular lip seal means being resiliently deflectable radially away from said axis from its unstressed position to define a check valve seal, and a reinforcing casing associated with said thin wall flange and extending from connection with said cylindrical body and extending generally radially outward therefrom to provide a securement to facilitate operative installation of said fluid seal unit into a shock absorber.*

*13. Improvement for a shock absorber having an oil cylinder concentrically received in an outer tube with a gas chamber defined therebetween and affixed to a piston rod bearing means operatively mounted to adjacent ends of said oil cylinder and said outer tube, said improvement comprising a single unitized fluid seal unit for installation in the shock absorber having a generally cylindrical and centralized body means of rubber-like material of a predetermined height with discrete upper and lower ends and having a central piston rod opening therethrough about a longitudinal axis, said body means having first and second annular lip seal means integral with said body means and extending radially into said piston rod opening and defining an inner diameter of said unit, said body means having an annular thin wall flange extending radially outward from integral connection with an annular area between the ends of said body means to a terminal position, a cylindrical seal portion depending along a line of revolution substantially parallel to said axis from integral connection with said thin wall flange, said depending cylindrical seal portion being radially spaced from said cylindrical body means, third annular lip seal means on the end of said depending cylindrical seal portion, said third annular lip seal means being resiliently deflectable outwardly from an initial position sealingly engaging the bearing means to define a check valve seal, and a reinforcing casing associated with said thin wall flange and extending from direct connection with said cylindrical body to provide a securement to facilitate operative installation of said fluid seal unit into the shock absorber.*

* * * * *